United States Patent [19]

Park

[11] Patent Number: 5,781,611
[45] Date of Patent: Jul. 14, 1998

[54] METHOD AND APPARATUS FOR MONITORING STATUS OF SPEECH CONNECTION BETWEEN CENTRAL OFFICE LINES

[75] Inventor: Seong-Kue Park, Gumi, Rep. of Korea

[73] Assignee: SamSung Electronics Co., Ltd., Suwon, Rep. of Korea

[21] Appl. No.: 662,526

[22] Filed: Jun. 13, 1996

[30] Foreign Application Priority Data

Jun. 13, 1995 [KR] Rep. of Korea ............... 1995 15576

[51] Int. Cl.$^6$ .................. H04M 1/24; H04M 3/08; H04M 3/22
[52] U.S. Cl. ................ 379/34; 379/6; 379/12; 379/31; 370/241; 370/251
[58] Field of Search ................ 379/2, 5, 9–10, 379/15, 34, 225, 156, 157, 161, 163, 164, 165, 172, 173, 12, 14, 27, 29, 32, 211, 212; 370/241, 242, 248, 249, 251

[56] References Cited

U.S. PATENT DOCUMENTS

| | | | |
|---|---|---|---|
| 3,704,346 | 11/1972 | Smith et al. | 379/156 |
| 3,798,382 | 3/1974 | Hoven . | |
| 3,959,600 | 5/1976 | Sousa . | |
| 4,027,109 | 5/1977 | Smith et al. . | |
| 4,117,270 | 9/1978 | Lesea . | |
| 4,303,804 | 12/1981 | Johnson et al. . | |
| 4,317,007 | 2/1982 | Harrison . | |
| 4,405,833 | 9/1983 | Cave et al. . | |
| 4,774,722 | 9/1988 | Sherman . | |
| 5,195,085 | 3/1993 | Bertsch et al. | 379/1 |
| 5,276,727 | 1/1994 | Kim et al. | 379/29 |
| 5,335,266 | 8/1994 | Richardson, Jr. et al. . | |
| 5,353,326 | 10/1994 | Jung | 379/6 |

*Primary Examiner*—Curtis Kuntz
*Assistant Examiner*—Binh K. Tieu
*Attorney, Agent, or Firm*—Robert E. Bushnell, Esq.

[57] ABSTRACT

A method and apparatus for monitoring the status of a speech connection between central office lines in a private exchange system may be constructed with a controlling unit for controlling a connection between a network and a corresponding central office line to perform a speech connection between first and second central office lines; a line interface unit for interfacing the first and second central office lines under the control of the controlling unit; a network unit for connecting the first and second central office lines to each other under the connection control of the controlling unit; and a speech monitoring the status of unit for monitoring the speech connection during the connection of the first and second central office lines, by directly detecting the presence or absence of a signal from the first and second central office lines inputted thereto through the network unit without interrupting the connection between the first and second central office lines and for outputting the speech connection status to the controlling unit such that the first and second central office lines are disconnected in the absence of the signal for a predetermined period of time.

8 Claims, 3 Drawing Sheets

METHOD AND APPARATUS FOR MONITORING STATUS OF SPEECH CONNECTION BETWEEN CENTRAL OFFICE LINES

CLAIM OF PRIORITY

This application make reference to, incorporates the same herein, and claims all benefits accruing under 35 U.S.C § 119 from an application entitled DEVICE FOR MONITORING SPEECH CONNECTION STATE BETWEEN CENTRAL OFFICE LINE AND OPERATING METHOD THEREFOR earlier filed in the Korean Industrial Property Office on 13 Jun. 1995 and assigned Ser. No. 15576/1995.

BACKGROUND OF THE INVENTION

1. Field of the Invention

The present invention relates to a private exchange system, and more particularly, to a method and apparatus for monitoring the status of a speech connection between central office lines during an external call forwarding function or a C.O-to-C.O connection function.

2. Description of the Related Art

Generally, an external call forwarding function or a C.O-to-C.O connection function has been very usefully utilized in prior art key telephone or private exchange systems. Most of all, the C.O-to-C.O connection function means that when a telephone call exists through a preset central office line, the call is sent back through another central office line directly selected by a person (e.g., an outsider) or a telephone number previously stored in a memory of a private exchange system is automatically dialed by the system. With respect to the private exchange system, the external call forward function is the same as the C.O-to-C.O connection function. That is, the common point is that the central office lines are connected to each other via a system network without the intervention of an extension subscriber.

In the conventional system, when the central office lines are connected to each other, the extension subscriber necessarily resets the corresponding central office line and the network thereby resets to its initial state, at the time when the telephone call is over, e.g., the extension subscriber hangs up the telephone. In the C.O-to-C.O connection function however, the private exchange system cannot monitor the status of a speech connection between two central office lines, which is regarded as a defect thereof. That is, since an extension subscriber does not intervene, it is not possible to notice the completion of a telephone call. In an earlier effort to overcome such a problem, a corresponding function operating time (e.g., 3 minutes) is preset, which can be varied according to a user's need through user programming. Thus, during the performance of the corresponding function, the system effects a connection for the corresponding time regardless of the status of the call and disconnects the call at the expiration of the preset time, which causes the following problems.

I have found that primarily, despite central office line callers having finished their telephone call through the C.O-to-C.O connection function or the external call forwarding function, the central office line and the network are not returned to their initial state until the passage of the preset period of time. In this case, the lines are tied-up unnecessarily.

On the other hand, even if the callers wish to continue their telephone call for a period of time longer than the preset time period, they are disconnected when the preset time period has expired. At this point, the callers have to inconveniently call again to re-establish the connection.

Hoven, U.S. Pat. No. 3,798,382 for Voice-Monitoring Control Circuit, and Johnson, et al., U.S. Pat. No. 4,303,804 for Telephone-Conferencing Apparatus And Method Having Line Location, each discloses telephone systems in which a telephone line is monitored to determine if there is speech on the monitored line. The conversation monitor circuit 161 of Johnson, et al. '804, illustrated in FIG. 4 thereof and discussed in lines 24 through 46 of column 10 thereof, is of particular interest. Neither Hoven '382 nor Johnson, et al. '804 however, teach or suggest the application of speech monitoring to a private exchange system.

SUMMARY OF THE INVENTION

Accordingly, it is an object of the present invention to provide a method and apparatus for monitoring the status of a speech connection between central office lines, thereby avoiding the prior art inconveniences as described above.

It is another object of the present invention to provide a method and apparatus for monitoring the status of speech connection between central office lines, capable of providing convenience to a user in light of the system operation.

Those and other objects can be achieved according to the principles of the present invention with a method and apparatus for monitoring the status of a speech connection between two of a plurality of central office lines in a private exchange system. A controlling unit controls a connection between a network and a corresponding central office line to perform a speech connection between first and second central office lines; and a line interface unit interfaces the first and second central office lines under the control of the controlling unit. A network unit connects the first and second central office lines to each other under the control of the controlling unit; and a speech monitoring unit monitors the status of the speech connection during the connection of the first and second central office lines, by directly detecting the presence or absence of a signal from the first and second central office lines input thereto through the network unit without interrupting the connection between the first and second central office lines and generates and an output indicative of the speech connection status for the controlling unit so that the first and second central office lines are disconnected in the absence of the signal for a predetermined period of time.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Figure 1:
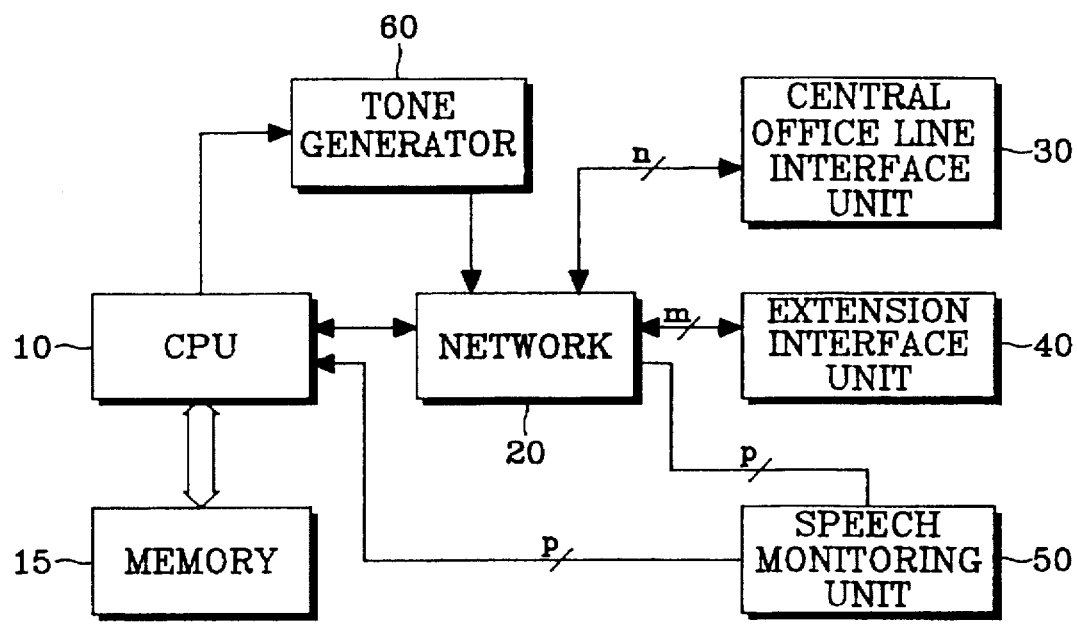
FIG. 1 is a block diagram illustrating a private exchange system which is related to the present invention.

Throughout the drawings, it is noted that the same reference numerals or letters will be used to designate like or equivalent elements having the same function. Furthermore, in the following description, numerous specific details are set forth to provide a more thorough understanding of the present invention. It will be apparent, however, to one skilled in the art that the present invention may be practiced without these specific details. A detailed description of known functions and constructions unnecessarily obscuring the subject matter of the present invention has been omitted in the present application to improve its clarity.

FIG. 1 is a block diagram providing a simplified illustration of a private exchange system that is related to the present invention, shown with a central processing unit 10 (hereinafter, referred to as a CPU), a memory 15, a network 20, a central office line interface unit 30, an extension interface unit 40, a speech monitoring unit 50 and a tone generator 60. While a general private exchange system is more complicated than that of the structure as shown in FIG. 1, various elements have been omitted herein since they are not directly related to the present invention and most of such elements, except for the speech monitoring unit 50 in FIG. 1, are basic to the private exchange system. Thus, the speech monitoring unit 50 is characteristic of the present invention.

In the circuit represented by the block diagram of FIG. 1, the speech monitoring unit 50, connected to the network 20, serves as a comparing circuit for sensing an envelope of a tone signal or a voice signal applied via the network 20 and for generating the sensed envelope as a logic "1" state or a "0" logic state to the CPU 10. The CPU 10 scans an output logic state from the speech monitoring unit 50 and performs its control operation related to the speech monitoring.

Figure 2:
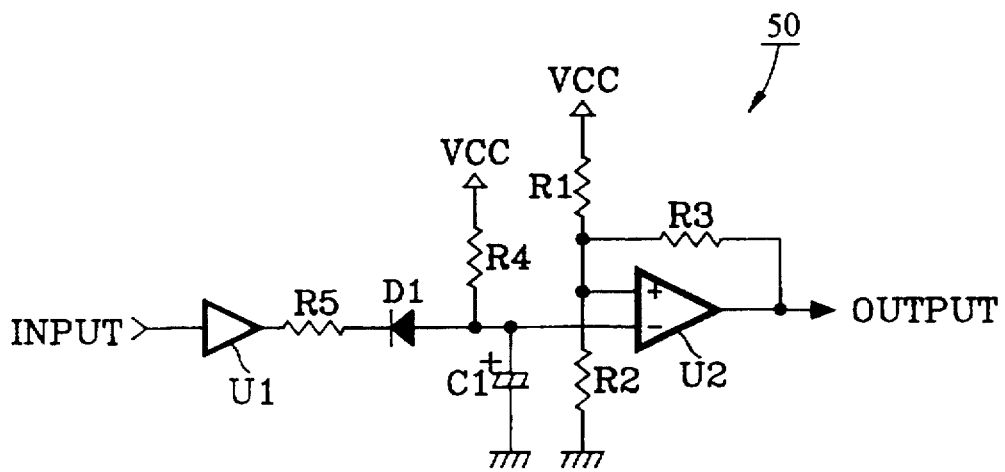
FIG. 2 is a detailed circuit diagram illustrating a speech monitoring unit 50 of FIG. 1.

As shown in FIG. 2, a preferred embodiment of the speech monitoring unit 50 comprises a signal transmitter U1 and a comparator U2. When a voice signal or a tone signal is inputted, the signal transmitter U1 forms a ground path. Otherwise, that is, when the voice signal or the tone signal is not inputted, the signal transmitter U1 interrupts the ground path. The comparator U2 outputs the logic high state or the logic low state to the CPU 10, in response to the formation and interruption of the ground path.

When the voice signal or the tone signal is not input via the network 20 of FIG. 1, the signal transmitter U1 output is an open circuit and a capacitor C1 is charged to a power supply voltage $V_{CC}$ through a resistor R4. Thus, the voltage of an inverting terminal (−) of the comparator U2 becomes higher than a reference voltage, set by resistors R1 and R2, applied to a non-inverting terminal (+). At this time, the output of the comparator U2 is maintained at a low logic state. When the voice signal or tone signal is continuously input via the network 20 however, the signal transmitter U1 output is grounded and the charge stored in the capacitor C1 is discharged to the ground path of the signal transmitter U1 via a diode D1 and a resistor R5 when the ground path is formed. Accordingly, the potential of the inverting terminal (−) becomes lower than that of the non-inverting terminal (+), and thus, the output of the comparator U2 is maintained at a logic high state. The output of the comparator U2 is output to CPU 10.

It is unnecessary for the number of speech monitoring units 50 to be equal to the number of central office lines connected to the private exchange system. Consequently, in consideration of the system efficiency, it is preferable for the number of speech monitoring units 50 to be equal to 30% of the number of central office lines.

Figure 3A:
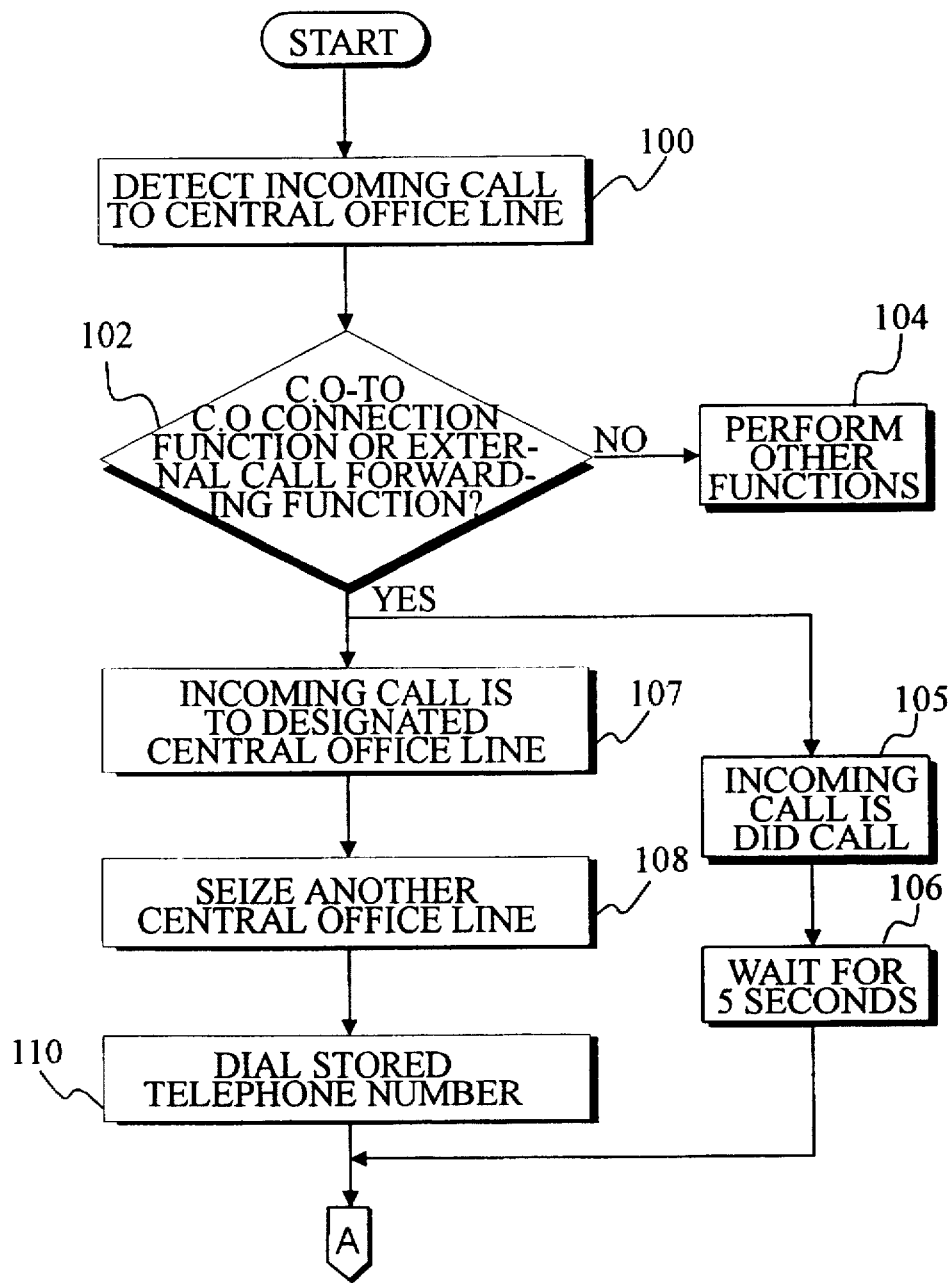
FIGS. 3A and 3B together form a flowchart illustrating the operation for monitoring the status of a speech connection according to the principles of the present invention.
Figure 3B:
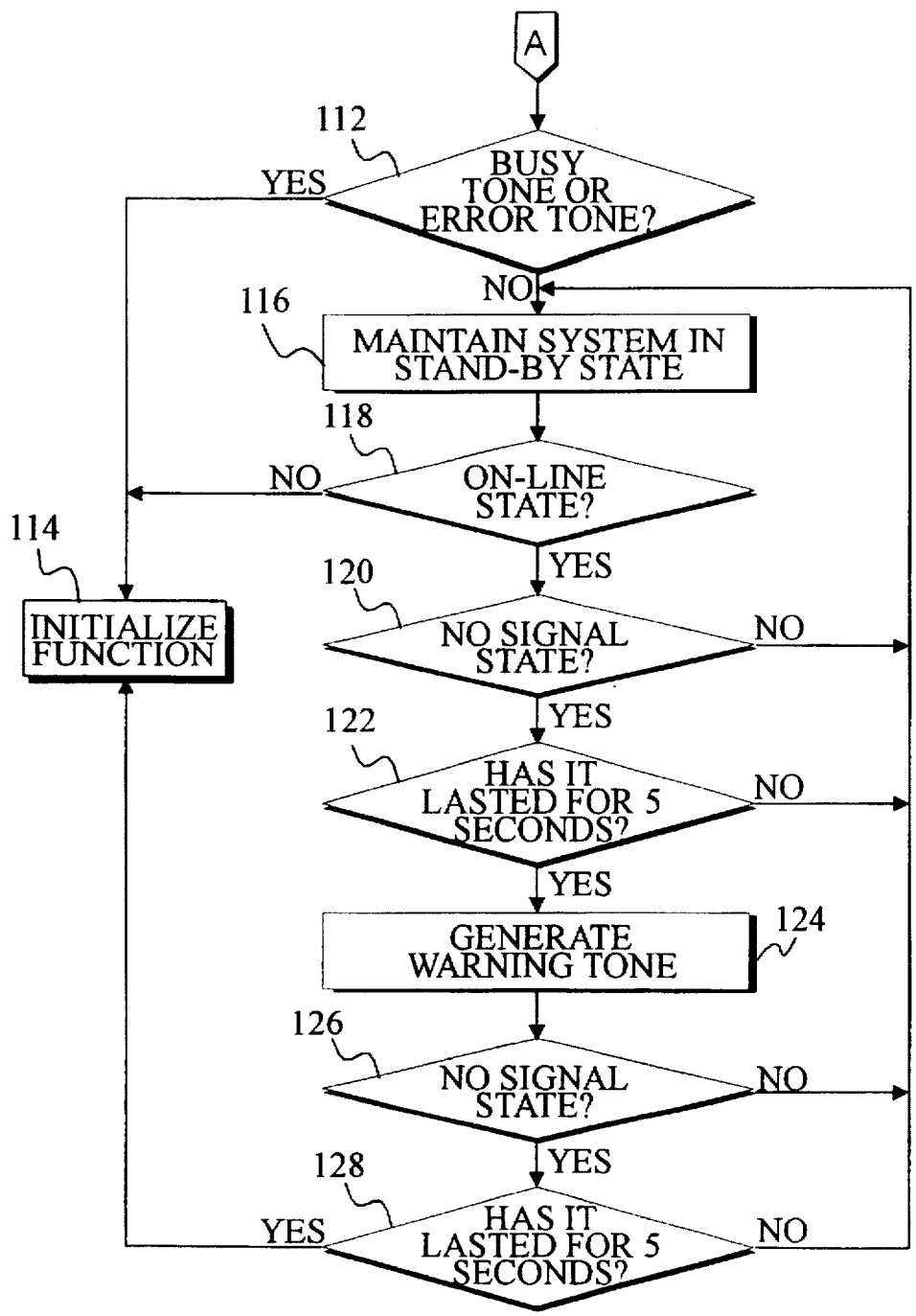

FIGS. 3A and 3B together form flowchart illustrating the operation of monitoring the status of the speech connection according to the principles of the present invention. In connection with FIG. 3A, in step 100, CPU 10 detects an incoming call to a central office line, and then the system proceeds to step 102. In step 102, CPU 10 determines whether the incoming call to the central office line is effected through a C.O-to-C.O connection function or through an external call forwarding function. The above function determination by CPU 10 is based on whether the incoming call is via a central office line set in a direct inward dialing (DID) system, or arranged to dial another central office line or whether the incoming call is to a previously designated central office line.

In step 102, when CPU 10 has determined that there is no function corresponding to the present invention, CPU 10 performs other functions in step 104. On the contrary, when during step 102 CPU 10 determines that the central office line corresponds to the designation of step 107, namely that the C.O-to-C.O connection function or the external call forwarding function and the function corresponds to an incoming call to a previously designated central office line, then CPU 10 seizes another central office line in step 108, and the system then proceeds to step 110. In step 110, CPU 10 dials the telephone number stored in the memory 15. In the event that the C.O-to-C.O connection function or the external call forwarding function in step 102 corresponds to the designation in step 105, namely a DID incoming call, CPU 10 waits for about five seconds in step 106.

Subsequently, as shown in FIG. 3B, in step 112, CPU 10 monitors through the speech monitoring unit 50, a busy tone or an error tone provided when a corresponding telephone number is busy or incorrect. When the tone detection through the speech monitoring unit 50 is being monitored by CPU 10, CPU 10 scans the output of the speech monitoring unit 50 every 100 milliseconds for about two to three seconds and compares a tone cadence with the scanned output. At the initial period of the tone detection, CPU 10 continuously performs such a comparison operation for about twenty to thirty seconds.

If the busy tone or the error tone is detected in step 112, then CPU 10 performs function initialization in step 114. If the busy tone or the error tone is not detected in step 112, then in step 116, CPU 10 maintains the system in a stand-by state in order to provide the C.O-to-C.O connection function or the external call forwarding function. While it is preferably adequate to maintain the system in the stand-by state for about thirty seconds, the stand-by state time of the system can be adjustable in consideration of system performance and efficiency.

Following the step 116, CPU 10 proceeds to step 118. In step 118, CPU 10 checks whether or not the central office line callers are in an on-line state (i.e., whether or not the busy tone is detected). Thus, when it is determined that the central office line callers are not in an on-line state, that is, that the speech of the caller was over, CPU 10 initializes its function. Namely, CPU 10 returns the connection of the network 20 to its initial position from the speech function service. On the other hand, when it is determined in step 118 that the central office line callers are in an on-line state, CPU 10 proceeds to steps 120 and 122, thereby checking whether or not the no signal state has lasted for a given number of seconds, for instance, for about five seconds. Hereinabove, a no signal state is the state where no response is heard from the caller. The no-signal state is monitored by the speech monitoring unit 50 which is characteristic of the present invention.

When the no signal state has lasted for about five seconds, CPU 10 proceeds to step 124, thereby connecting the tone generator 60 of FIG. 1 through network 20 and central office line interface unit 30, thus providing a warning tone to the caller. Then, CPU 10 checks whether or not the no signal state has lasted for approximately five seconds by performing steps 126 and 128. When the no signal state has lasted for about five seconds, CPU 10 regards the speech to be over, thereby performing function initialization in step 114. When a "no" indication has been determined in any of steps 120, 122, 126 and 128 however, CPU 10 recognizes that the caller is in an on-line state, thereby returning to step 116. After making that determination, CPU 10 continuously maintains the system in the stand-by state.

As apparent from the foregoing, upon using the external call forwarding function or the C.O-to-C.O connection function, the present invention can monitor the status of the speech connection. As a result, it has an effect on preventing the speech in the on-line state from being interrupted and the on-line state after the completion of the speech from lasting.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for monitoring the status of a speech connection between the two of a plurality of central office lines in a private exchange system, comprising:
   a controlling unit for controlling a connection between a network and a corresponding central office line to perform a speech connection between first and second central office lines;
   a line interface unit for interfacing the first and second central office lines under the control of said controlling unit;
   a network unit for connecting said first and second central office lines to each other under the control of said controlling unit; and
   a speech monitoring unit for monitoring the status of said speech connection during the connection of said first and second central office lines, by directly detecting the presence or absence of a signal from said first and second central office lines received through said network unit without interrupting the connection between said first and second central office lines and for providing an indication of said speech connection status to said controlling unit, said first and second central office lines being disconnected in the absence of said signal for a predetermined period of time.

2. The apparatus as claimed in claim 1, wherein said speech monitoring unit comprises is a comparator for comparing a tone signal and a voice signal supplied from one of first and second central office lines via said line interface unit with a preset reference voltage.

3. A method of monitoring the status of a speech connection between two of a plurality of central office lines in a private exchange system, comprising the steps of:
   (a) controlling the speech connection status between the two of the plurality of central office lines, in response to a signal input corresponding to a speech connection between the two of the plurality of central office lines;
   (b) checking on a basis of an occurrence of a particular tone signal received in the two of the plurality of central office lines, whether or not the speech connection between the two central office lines is wrong;
   (c) directly checking the speech connection status after waiting for a predetermined period of time in during said step of controlling the speech connection status without interrupting the connection between the two central office lines;
   (d) interrupting said speech connection upon a determination of a speech non-connection status during said step of checking the speech connection status; and
   (e) again performing said step of checking the speech connection status after making a determination of a speech connection status during a previous performance of said step of checking the speech connection status.

4. The method as claimed in claim 3, wherein, during said step checking by a particular tone signal received, the particular tone signal received from the two central office lines is initially monitored for a time period in a range of from about twenty to thirty seconds.

5. The method as claimed in claim 3, wherein the particular tone signal is one of an error tone signal and a busy tone signal.

6. The method as claimed in claim 4, wherein the particular tone signal is one of an error tone signal and a busy tone signal.

7. The method as claimed in claim 3, further comprising the steps of:
   generating a warning tone to the two central office lines, in response to a determination of a no signal state when a voice signal fails to exist for a predetermined time period while performing said step of checking of the speech connection state; and
   interrupting the speech connection in response to an occurrence of said no signal state when a voice signal fails to exist for said predetermined time period, after transmitting the warning tone.

8. A method of monitoring the status of a speech connection between two of a plurality of central office lines in a private exchange system, comprising the steps of:
   a) detecting an incoming call to a central office line;
   b) determining that the incoming call requires a central office connection function or an external call forwarding function;
   c) when the incoming call is to a designated central office line, then seizing another central office line and dialing a previously stored telephone number and when the incoming call is a direct inward dialed call, then waiting for a predetermined period of time;
   d) determining whether one of a busy tone and an error tone is present on the two central office lines and, when one of a busy error tone and an error tone is determined to be not present on the two central office lines, maintaining the system in a standby state and, when one of a busy tone and an error tone is determined to be present on one of the two central office lines, initializing the private exchange system;
   e) after the system has been maintained in a standby state, determining whether the two central office lines are in an on-line state and, when the two central office lines are determined to be not in an on-line state, initializing the private exchange system and, when the two central office lines are determined to be in an on-line state, directly determining whether the two central office lines are in a no signal state without interrupting the connection between the two central office lines and, when the two central office lines are determined to be in a no signal state, determining whether the no signal state has lasted for another predetermined period of time and when the two central office lines are determined to be not in a no signal state, not returning the system to be maintained in a standby state;
   f) when the no signal state is determined to have lasted for more than the second predetermined period of time, generating a warning tone to the two central office lines and, when the no signal state is determined to not have lasted for more than the second period of time, returning the system to be maintained in a standby state;
   g) after generating the warning tone, determining whether the two central office lines are in a no signal state and, upon determining that the two central office lines are in a no signal state, determining whether the no signal state is has lasted for a third predetermined period of time and, upon determining that the no signal state has lasted for said third predetermined period of time, initializing the system and, upon determining that the no signal state has not lasted for said third predetermined period of time, returning the system to be maintained in a standby state.

* * * * *